United States Patent [19]
Omaru et al.

[11] Patent Number: 5,561,005
[45] Date of Patent: Oct. 1, 1996

[54] SECONDARY BATTERY HAVING NON-AQUEOUS ELECTROLYTE

[75] Inventors: Atsuo Omaru, Kanagawa; Shigeru Fujita, Tokyo; Keiichi Yokoyama; Akio Hihara, both of Chiba, all of Japan

[73] Assignees: Sony Corporation; Mitsui Petrochemical Industries, Ltd., both of Tokyo, Japan

[21] Appl. No.: 233,992

[22] Filed: Apr. 28, 1994

[30] Foreign Application Priority Data

Apr. 28, 1993 [JP] Japan .................................. 5-123076

[51] Int. Cl.$^6$ ................................................ H01M 10/40
[52] U.S. Cl. ................................................ 429/197
[58] Field of Search ............................... 429/197

[56] References Cited

U.S. PATENT DOCUMENTS

| | | | |
|---|---|---|---|
| H1076 | 7/1992 | Slane et al. | 429/197 |
| 4,056,663 | 11/1977 | Schlaikjer | 429/197 |
| 4,957,833 | 9/1990 | Daifuku et al. | 429/197 |
| 5,192,629 | 3/1993 | Guyomard et al. | 429/97 K |
| 5,272,022 | 12/1993 | Takami et al. | 429/197 |
| 5,292,601 | 3/1994 | Sugeno et al. | 429/197 |
| 5,294,498 | 3/1994 | Omaru et al. | 429/122 |
| 5,310,553 | 5/1994 | Simon et al. | 429/197 |
| 5,395,711 | 3/1995 | Tahara et al. | 429/197 |
| 5,451,477 | 9/1995 | Omaru et al. | 429/197 X |

OTHER PUBLICATIONS

Chemical Abstracts, vol. 118, Columbus, OH, Abstract No. 216436 Yoshida Hiroaki "A Study on Electrolytes of 4–Volt Secondary Lithium Cells" & GS News Tech Rep, May 1992, vol. 51, No. 2, Japan, pp. 20–26 * abstract *.

Chemical Abstracts, vol. 121, Columbus, OH, Abstract No. 61382, (no month) Terasaki, Masanao "Compositional Change of Electrolyte in Lix/Li1–xCoO2 Battery" *abstract*.

Patent Abstracts of Japan, vol. 17, No. 91 (E–1324) 23 Feb. 1993 & JP–A–04 284 374 (Sony Corporation) * abstract *.

Patent Abstracts of Japan, vol. 16, No. 344 (E–1239) 24 Jul. 1992 & JP–A–04 104 468 (Sanyo Electric Co. Ltd) * abstract *.

Patent Abstracts of Japan, vol. 14, No. 141 (E–0981) 20 Sep. 1990 & JP–A–02 172 (Bridgestone Corp.) * abstract *.

*Primary Examiner*—Prince Willis, Jr.
*Assistant Examiner*—Carol Chaney
*Attorney, Agent, or Firm*—Hill, Steadman & Simpson

[57] ABSTRACT

A secondary battery having a non-aqueous electrolyte according to the present invention includes a negative electrode using a carbonaceous material capable of doping and undoping lithium ions as the anode material, a positive electrode using a composite oxide of lithium and a transition metal as the cathode material, and a non-aqueous electrolyte formed by dissolving an electrolyte into a non-aqueous solvent, the non-aqueous solvent containing methylethyl carbonate and dimethyl carbonate. According to the present invention, a secondary battery having a non-aqueous electrolyte in which normal charge/discharge reactions can be maintained even in battery overcharge and after high-temperature storage of the charged battery, and which exhibits high energy density, long cycle life, high safety performance and excellent environment-resistance, can be produced.

7 Claims, 3 Drawing Sheets

SECONDARY BATTERY HAVING NON-AQUEOUS ELECTROLYTE

BACKGROUND OF THE INVENTION

This invention relates to a secondary battery having a non-aqueous electrolyte, and particularly to a secondary battery of a lithium ion based non-aqueous electrolyte employing a composite oxide of lithium and a transition metal for the positive electrode and a carbonaceous material capable doping and undoping of lithium ions for the negative electrode.

As typical secondary batteries, a nickel-cadmium battery and a lead battery having aqueous electrolytes have been broadly known. However, along with the recent consecutive emergence of new types of electronic equipment, such as, a VTR with a built-in camera, a portable phone and a lap top computer, higher energy density for the secondary battery as a portable power source has been demanded for a further reduction in size and weight of the equipment. The nickel-cadmium battery and the lead battery no longer can meet this demand. Also, nickel-cadmium and lead are not preferable in terms of environmental protection, and the use of these materials is subject to regulatory restraints in some countries. Thus, it has been demanded to develop secondary batteries employing alternates for these materials.

A non-aqueous electrolyte battery employing a non-aqueous electrolyte formed by dissolving an electrolyte into a non-aqueous solvent is now noted as an alternate for the nickel-cadmium battery and the lead battery.

A non-aqueous electrolyte battery of primary battery application has already been developed. With the primary battery, the negative electrode simply discharges, and does not require reversibility. It can be said that characteristics of the positive electrode determine the energy density of the battery. For this reason, a wide variety of materials are proposed and evaluated as activators employed for the positive electrode.

For developing the non-aqueous electrolyte battery of secondary battery application, characteristics of the active anode material are of greater importance to attain preferable cyclic characteristics. However, despite a large of number of reviews and examinations in view of the above, poor results have been obtained.

For example, though the lithium metal is used for the active anode material of the non-aqueous electrolyte battery of primary battery application, problems in using the lithium metal for a negative electrode material of the secondary battery have been pointed out from the initial stage of the review.

Specifically, if the lithium metal is used as the active anode material of the secondary battery, repetition of charge and discharge causes a dissolution-precipitation reaction of lithium at the negative electrode, precipitating lithium in a dendritic form. The precipitated lithium penetrates a separator to reach the positive electrode, thus generating an internal short-circuit. For this reason, the secondary battery has a short service life. Such lithium precipitation is conspicuously observed particularly in charging with a great current density or in quick charge.

The process of lithium precipitation can be delayed through milder charge and discharge, thus extending the cycle life to a certain degree.

However, high safety performance is an important requirement for practical use of the battery. With the use of the lithium metal as the negative electrode material, active lithium particles are formed at the negative electrode in the process of repeated dissolution and precipitation, regardless of the current density and despite the milder charge and discharge. The battery is jeopardized if an internal short circuit is generated in this state, or if the battery accidentally becomes deformed due to impact. It is reported that the probability of firing and explosion is approximately 0.4% at the worst. (See Abstracts of the Fall Meeting of the Electrochemical Society of Japan, 1991, p.127.)

In order to solve these problems, improvement of lithium precipitation form by improving the non-aqueous electrolyte has been attempted, and employment of a lithium-aluminum alloy or the like as the active anode material has been tested. However, no significant results have been obtained by using these techniques. In the case where the alloy is used as the anode electrode material, the battery has a poor cycle life on deep charge and discharge. In addition, the alloy, which is hard, cannot be coiled or spirally wound so that it can only be used for a small flat battery of coin shape.

Thus, based upon results of research on a lithium-graphite intercalation compound that lithium ions are doped between layers of graphite to be present as a stable compound, application of the lithium-graphite intercalation compound to the anode material of the battery is tested. It has also been made apparent that a variety of carbonaceous materials are capable of electrochemical dope and undope of lithium ions.

With the use of such carbonaceous materials for the negative electrode, and the use of a lithium composite oxide, such as a lithium-cobalt composite oxide, for the positive electrode, lithium in the state of ions travels between the positive and negative electrodes but does not precipitate in the form of metal on charge and discharge. Accordingly, it is possible to overcome the problems in safety generated by the precipitation of the lithium metal, and those in cycle life and quick charge/discharge. In addition, since the operating voltage of the negative electrode employing the carbonaceous material as the active anode material is 0 to 1.5 V, the high operating voltage of 4 V or higher of the positive electrode employing the lithium composite oxide as the active cathode material can be saved, thus completing a lithium ion secondary battery having a higher energy density.

Furthermore, another non-aqueous electrolyte battery of secondary battery application has been proposed, that is, a rocking chair (RC) type battery using a metal oxide of low charge/discharge potential as the active anode material and a metal intercalation compound for both the active cathode material and the active anode material. If the metal oxide of noble charge/discharge potential is used for the active anode material, the problems in safety and the like can be solved even with a lower energy density than in the case where the carbonaceous material is used for the active anode material. Therefore, the proposed battery is promising as a system for the lithium ion secondary battery which does not require a high voltage.

Meanwhile, a variety of secondary batteries having a non-aqueous electrolyte exhibiting a high energy density and a long cycle life have been proposed as described above. However, the battery to be used as a portable power source for private use must have no problem in operation in the abnormal use, that is, safety performance at the time of overcharge and an external short circuit, and environment-resistance on the assumption that the battery is left in a high-temperature circumstance, such as the inside of an automobile in summer.

Particularly, the temperature on the dash board of an automobile is known to reach 100° C. at most in summer.

Left in such a place, the battery would be exposed to the high temperature of approximately 100° C. for 8 hours in day time. In this case, safety and reliability at least for the surrounding environment must be assured, even though the battery itself is disabled.

The safety performance and environment-resistance against overcharge and exposition to the high temperature can be improved by selection of a non-aqueous solvent for the electrolyte. The non-aqueous solvent for the electrolyte is composed of a solvent with high dielectric constant, such as propylene carbonate (PC), and a low viscosity solvent, such as dimethoxyethane (DME) conventionally. It is disclosed in the JP Kokai Publication No.4-067998, that if a mixed solvent of PC with diethyl carbonate (DEC) instead of DME is used as the non-aqueous solvent, a large reduction in the cycle life at high temperatures in the case where the mixed solvent of PC and DME is used can be restricted.

However, though the large reduction in the cycle life at high temperatures can be restricted with the use of the mixed solvent of PC and DEC, the following trouble is often generated. That is, the temperature significantly rises through overcharge, and even after an anti-overcharging safety device of internal-pressure response type, if provided, operates, the temperature continues to rise, damaging the battery at a relatively high rate.

Although the cause of this trouble is not made clear, a reaction of DEC with the lithium metal excessively precipitated over the possible dope volume of the carbonaceous negative electrode in the process of temperature rising on overcharge can be considered to be the one from the following experimental fact. That is, when DEC and a lithium metal are stored in a closed container at a high temperature of approximately 60° C., DEC and the lithium metal quickly react with each other to turn the liquid yellow. The reaction is accelerated by a heat of reaction accompanying generation of gas, and the liquid is finally solidified.

Also, if stored at high temperatures in a charged state, the secondary battery having a non-aqueous electrolyte employing the mixed solvent of PC and DEC experiences self-discharge to lower the voltage, and may suffer irreversible deterioration in capacity which cannot recover through another charge/discharge cycle.

Although the reason for this is uncertain, it is considered that the deterioration in the battery capacity is caused by deterioration of the positive electrode, the negative electrode or the electrolyte for some reasons, from high impedance of the battery after being stored at high temperatures in the charged state.

Thus, the secondary battery having the non-aqueous electrolyte, though superior to the nickel-cadmium battery and the lead battery in terms of energy density and environmental protection, has been so far insufficient in safety and environment-resistance.

SUMMARY OF THE INVENTION

In view of the above-described status of the art, it is an object of the present invention to provide a secondary battery having a non-aqueous electrolyte which exhibits a higher energy density, a longer cycle life, higher safety performance and excellent environment-resistance.

In consideration that it is necessary to use a low viscosity solvent which is less reactive with lithium, the present inventors have broadly searched for such a low viscosity solvent, finally finding a mixed solvent of methylethyl carbonate and dimethyl carbonate.

A secondary battery having a non-aqueous electrolyte of the present invention has been completed on the basis of such knowledge, and the battery includes a negative electrode using a carbonaceous material capable of dope and undope of lithium ions as an active anode material, a positive electrode using a composite oxide of lithium and a transition metal as an active cathode material, and a non-aqueous electrolyte formed by dissolving an electrolyte into a non-aqueous solvent, the non-aqueous solvent containing methylethyl carbonate and dimethyl carbonate.

In the secondary battery having a non-aqueous electrolyte employing the carbonaceous material capable of dope and undope of lithium as the active anode material and employing the lithium-transition metal composite oxide as the active cathode material, with the use of a mixed solvent of methylethyl carbonate and dimethyl carbonate as a low viscosity solvent of the electrolyte, low reactivity of the methylethyl carbonate with the lithium metal prevents a reaction with the lithium metal precipitated at the negative electrode in the case where the temperature is raised through overcharge, thus preventing damages to the battery caused by the reaction of the low viscosity solvent with the lithium metal. Also, lowering of voltage in the case where the charged battery is left at high temperatures can be suppressed by the dimethyl carbonate, and an irreversible reduction in capacity which cannot recover through a charge/discharge cycle, can be prevented.

In addition, if a predetermined amount of diethyl carbonate having a high boiling point is added to a solvent with high dielectric constant and the mixed solvent of methylethyl carbonate and dimethyl carbonate, a rise of internal pressure of the battery can be suppressed even when the battery is exposed to high temperatures, such as when the battery is left on the dash board of an automobile in summer. Thus, reliability of the battery can be improved.

DETAILED DESCRIPTION OF THE INVENTION

The secondary battery having a non-aqueous electrolyte of the present invention includes a negative electrode using a carbonaceous material capable of dope and undope of lithium ions as an active anode material, a positive electrode using a composite oxide of lithium and a transition metal as an active cathode material, and a non-aqueous electrolyte formed by dissolving an electrolyte into a non-aqueous solvent, the non-aqueous solvent containing methylethyl carbonate and dimethyl carbonate.

The active anode material is a carbonaceous material having an interplanar distance of the (002) plane of 0.37 nm or greater, a true density of 1.7 g/cm$^3$ or less, and an exothermic peak at 700° C. or lower, observed in differential thermal analysis (DTA) in the air current. The non-aqueous solvent contains propylene carbonate (PC), methylethyl carbonate (MEC) and dimethyl carbonate (DMC).

The active anode material is also a carbonaceous material having the interplanar distance of the (002) plane of 0.340 nm or smaller, the crystallite size of 14.0 nm or greater in C axis, and the true density of 2.1 g/cm$^3$ or greater. The non-aqueous solvent contains ethylene carbonate (EC), methylethyl carbonate and dimethyl carbonate.

In addition, the mixing ratio of methylethyl carbonate and dimethyl carbonate of the non-aqueous solvent is expressed as follows:

$$3/10 \leq (M+D)/T \leq 7/10$$

with T denoting the total volume of non-aqueous solvent, M the volume of methylethyl carbonate, and D the volume of dimethyl carbonate.

Also, the mixing ratio of methylethyl carbonate and dimethyl carbonate of the non-aqueous solvent is expressed as follows:

$$1/9 \leq D/M \leq 8/2$$

with M denoting the volume of methylethyl carbonate, and D the volume of dimethyl carbonate.

In addition, diethyl carbonate (DEC) is added to the non-aqueous solvent by 1 to 20 vol %.

The secondary battery having the non-aqueous electrolyte includes the negative electrode, the positive electrode and the non-aqueous electrolyte contained in a battery can.

Although any one of active anode materials employed for secondary batteries of this type can be used for the negative electrode of the present battery, the following carbonaceous materials are preferable.

First, a carbonaceous material which cannot be graphitized even if processed at approximately 3000° C. can be employed, that is, a non-graphitizable carbon.

As a starting material for forming such a non-graphitizable carbonaceous material, a furan resin consisting of furfuryl alcohol or of homopolymer or copolymer of furfural is preferable. The carbonaceous material obtained by carbonizing a furan resin exhibits highly desirable characteristics for the active anode material of the battery, having the interplanar distance of the (002) plane of 0.37 nm or greater, the true density of 1.70 g/cc or less, and the exothermic peak at 700° C. or lower in the differential thermal analysis.

Another example of the starting material is an organic material formed by introducing a functional group containing oxygen into a petroleum pitch having a specific H/C atomic ratio, that is, by so-called oxygen cross linking. This organic material can be carbonized to be a carbonaceous material of excellent characteristics, similarly to the above-mentioned furan resin.

The petroleum pitch can be produced from tar or asphalt formed on high-temperature thermal decomposition of coal tar, ethylene bottoms or crude oil, through distillation (such as vacuum distillation, atmospheric distillation or steam distillation), thermal polycondensation, extraction or chemical polycondensation.

The H/C atomic ratio of petroleum pitch is important factor, and the H/C atomic ratio of 0.6 to 0.8 is preferable for producing non-graphitizable carbon.

The methods for introducing the oxygen-containing functional group into these petroleum pitches can be exemplified by: a wet method using aqueous solutions of nitric acid, mixed acids, sulfuric acid or hypochlorous acid; a dry method using oxidizing gases, such as air and oxygen; and a reaction of solid reagents, such as sulfur, ammonium sulfate, ammonium persulfate or ferric chloride.

If the oxygen-containing functional group is introduced into the petroleum pitch by using any of the above techniques, the ultimate carbonaceous material can be produced in a solid-phase state without being melted in the carbonization process approximately at 400° C. The process is similar to that for non-graphitizable carbon formation.

The active anode material may be produced by carbonizing the petroleum pitch with the oxygen-containing functional group introduced therein. An anode material having a larger amount of lithium dope per unit weight can be produced under such conditions as to produce a carbonaceous material not having the exothermic peak at temperatures of 700° C. or higher observed in DTA with the interplanar distance of the (002) plane of 0.37 nm or greater and the true density of 1.70 g/cc or less. For example, the interplanar distance of the (002) plane of 0.37 nm or greater of the carbonaceous material to be formed can be realized by setting the oxygen content of 10 wt % or more of the precursor of the oxygen cross-linked petroleum pitch. Accordingly, the preferable oxygen content of the precursor is not less than 10 wt %, and practically, within a range of 10 to 20 wt %.

Any organic material for oxygen cross linking having the H/C atomic ratio of 0.6 to 0.8 can be employed. That is, organic materials produced by pre-heat processing, such as pitch forming, of the following starting materials, can be used.

Such starting materials are: organic high molecular compounds, such as, phenol resin, acrylic resin, halogenated vinyl resin, polyimide resin, polyamideimde resin, polyamide resin, conjugate resin, cellulose and its derivatives; condensed polycyclic hydrocarbon compounds, such as, naphthalene, phenanthrene, anthracene, triphenylene, pyrene, perylene, pentaphene, and pentacene; derivatives thereof, such as, carboxylic acids, carboxylic anhydrides, and carboxylic imides; various pitches consisting mainly of mixtures of the foregoing compounds; condensed heterocyclic compounds, such as, acenaphtylene, indole, isoindole, quinoline, isoquinoline, quinoxaline, phthalazine, carbazole, acridine, phenazine, and phenanthridine; and derivatives thereof.

Still another example of the active anode material is a carbonaceous material which is graphitized by being heat-treated at approximately 3000° C., that is, graphitizable carbon.

Organic materials as starting materials of the graphitizable carbon are represented by coal and pitches.

The pitches are exemplified by those produced from tar or asphalt formed on high-temperature thermal decomposition of coal tar, ethylene bottoms or crude oil, through distillation (such as vacuum distillation, atmospheric distillation or steam distillation), thermal polycondensation, extraction or chemical polycondensation, and by those formed on wood carbonization.

The polymer materials are exemplified by polyvinyl chloride resin, polyvinyl acetate, polyvinyl butylate, and 3,5-dimethyl phenol resin.

These starting materials are in liquid states at the highest temperature of approximately 400° C. in the carbonization process. When maintained at that temperature, the starting materials have aromatic cycles condensed into a polycyclic stacked state. When heated at approximately 500° C. or above, the starting materials form carbon precursors, that is, semi-cokes. Such a process is called a liquid-phase carbonization process, which is a typical process of graphitizable carbon formation.

As a matter of course, the materials of coal, pitches and high molecular compounds on carbonization are subject to the liquid-phase carbonization process.

Other starting materials can be exemplified by: condensed polycyclic hydrocarbon compounds, such as, naphthalene, phenanthrene, anthracene, triphenylene, pyrene, perylene, pentaphene, and pentacene; derivatives thereof, such as, carboxylic acids, carboxylic anhydrides, and carboxylic imides; mixtures of the foregoing compounds; condensed heterocyclic compounds, such as, acenaphtylene, indole, isoindole, quinoline, isoquinoline, quinoxaline, phthalazine, carbazole, acridine, phenazine, and phenanthridine; and derivatives thereof.

For producing the carbonaceous material using the above-mentioned organic starting material, it suffices to carbonize the material in a nitrogen current at 300° to 700° C., and subsequently calcine the carbonized material in a nitrogen current at the temperature rising rate of 1° to 20° C. per minute, with the ultimate temperature of 900° to 1300° C., and the retention time of 0 to 5 hours at the ultimate temperature. As a matter of course, the carbonization process can be omitted.

In addition, as the active anode material, a graphite-based carbonaceous material having the interplanar distance of the (002) plane of not greater than 0.340 nm, the crystallite size of not less than 14.0 nm in C-axis, and the true density of not less than 2.1 g/cm$^3$ is excellent in electrode chargeability, and thus can be used for producing a large-capacity battery.

The carbonaceous material exhibiting the above-described characteristic parameters is typically exemplified by natural graphite. Also, artificial graphite produced by carbonizing an organic material and by further heat treating the carbonized material exhibits the characteristic parameters. For producing the artificial graphite, the graphitizable carbonaceous material is used as a precursor, to be heat-treated at high temperatures of not lower than 2000° C.

The foregoing carbonaceous materials are ground and classified into the anode material. The grinding can be carried out in carbonization, in calcination, before and after the high-temperature heat processing, or in the temperature rising process.

In addition, a special compound having a greater amount of lithium dope can be produced by adding phosphorus compounds to a precursor of the non-graphitizable carbonaceous material or the graphitizable carbonaceous material in carbonization. The resulting compound can be used as the active anode material.

As the phosphorus compounds to be added, phosphorus oxides, such as phosphorus pentoxide, oxo acids, such as orthophosphoric acid, and salts thereof can be employed. Phosphorus oxides and phosphoric acids are most preferred in terms of ease in handling.

The amount of addition of the phosphorus compounds is 0.2 to 30 wt %, and preferably 0.5 to 15 wt %, while the amount of residual phosphorus in the anode material is 0.2 to 9.0 wt %, and preferably 0.3 to 5 wt %, based upon the amount of the organic material or the carbonaceous material.

The compound consists mainly of carbon, oxygen and phosphorus, hereinafter referred to as C-P-O compound. The C-P-O compound having the peak of a phosphorus atom 2p orbital spectrum at 135.0 eV or less, with a peak in a range of ±100 ppm on the basis of orthophosphoric acid (0 ppm) in a $^{31}$p nucleus—solid NMR spectrum, and with a bonding energy of 284.6 eV between carbons of a carbon atom is orbital spectrum in the X-ray photoelectronic spectrometry, exhibits preferable characteristics.

If the phosphorus compound is added to the already carbonaceous material, the amount of residual phosphorus is reduced, though the C-P-O compound is formed, thus resulting in little increase in the amount of lithium dope. Therefore, it is preferable to add the phosphorus compound to the starting material, if possible.

The C-P-O compound produced by calcination is ground and classified into the anode material. The grinding may be carried out before and after the calcination or in the temperature rising process.

On the other hand, as the active cathode material employed for the positive electrode, an intercalation compound or the like containing Li or lithium composite metal oxide expressed by a general formula, $Li_x MO_2$, with M denoting at least one of Co, Ni and Mn. Particularly, the intercalation compound using $LiCoO_2$ exhibits a high energy density.

Also, since the non-aqueous electrolyte battery of the present invention is intended to achieve high capacity, the positive electrode in a stationary condition, such as, after 5 repetitions of charge/discharge, needs to contain Li of the amount corresponding to the charge/discharge volume of not less than 250 mAh per gram of the active anode material, and preferably contains Li of the amount corresponding to the charge/discharge volume of not less than 300 mAh. It is more preferable that the positive electrode contains Li of the amount corresponding to the charge/discharge volume of not less than 350 mAh. Meanwhile, the supply of Li from the positive electrode is not necessarily required. In short, it suffices that Li of the amount corresponding to the charge/discharge volume of not less than 250 mAh per gram of the active anode material is present in the battery. The amount of Li can be calculated by measuring the discharge capacity of the battery.

The negative and positive electrodes as described above are contained within the battery can along with the non-aqueous electrolyte formed by dissolving the electrolyte into the non-aqueous solvent, thus being subject to the charge/discharge reaction.

For the negative and positive electrodes to maintain the charge/discharge reaction even though the battery has been overcharged or left at high temperatures, selection of the non-aqueous solvent to be used is critical. The non-aqueous solvent of the electrolyte is composed of a solvent with high dielectric constant and low viscosity. However, some of the low viscosity solvents, such as diethyl carbonate, if heated through overcharge, react with lithium precipitated at the negative electrode, accompanying temperature rising, thus causing damage to the battery. Such solvents also cause deterioration if the charged battery is left at high temperatures, thus deteriorating the capacity of the battery.

Thus, in the present invention, for producing a battery exhibiting excellent safety performance and environment-resistance to maintain normal charge/discharge reactions even if overcharged or left at high temperatures in a charged state, a mixed solvent of composed of methylethyl carbonate (MEC) and dimethyl carbonate (DMC) is used as the low viscosity solvent for the electrolyte.

MEC is a non-aqueous solvent having extremely low reactivity with the lithium metal. Consequently, the use of such MEC prevents damage to the battery caused by the reaction of the lithium metal with the low viscosity solvent due to the temperature rise through overcharge. However, if the non-aqueous solvent is composed only of MEC and the solvent with high dielectric constant, such as propylene carbonate (PC), the charged battery, if left at high temperatures, causes the voltage to be gradually lowered, generating irreversible deterioration in capacity which cannot recover through another charge/discharge cycle.

Thus, in the present invention, DMC is mixed as a second low viscosity solvent into the non-aqueous solvent. The mixture of DMC with the solvent with high dielectric constant and MEC into the non-aqueous solvent allows production of a secondary battery having a non-aqueous electrolyte, which prevents the lowering in the voltage caused by the high-temperature storage of the charge battery and maintains the normal charge/discharge reaction even through the overcharge and the high-temperature storage of the charged battery.

Meanwhile, the solvent with high dielectric constant used for the non-aqueous solvent can be preferably selected from the carbonaceous materials used for the active anode materials, while normally employed materials, such as PC and ethylene carbonate, can be used. For example, in case where the graphite-based carbonaceous material is used as the active anode material, with the use of PC as the solvent with high dielectric constant, the solvent is caused to decompose. Therefore, it is preferable to use ethylene carbonate as the solvent with high dielectric constant. In case where the carbonaceous material, not graphite-based, is used as the active anode material, it is preferable to use PC for the solvent with high dielectric constant.

It is preferable to set the mixing ratio of MEC and DMC in the following range:

$$2/10 \leq (M+D)/T \leq 8/10$$

and more preferably, $$3/10 \leq (M+D)/T \leq 7/10$$

with T denoting the total volume of the non-aqueous solvent, M denoting the MEC volume, and D denoting the DMC volume.

In addition, the mixing ratio of MEC and DMC as the low viscosity solvent can be preferably set as follows:

$$1/9 \leq D/M \leq 8/2$$

If the D/M ratio is lower than 1/9, the capacity deterioration prevention effects due to DMC will be insufficient. On the other hand, if the D/M ratio exceeds 8/2 to cause the mixing ratio of DMC to be excessively high, the relatively low boiling point of DMC may cause a rise in internal pressure of the battery left at high temperatures.

That is, under such conditions that the battery is left on the dash board of an automobile in summer, the rise in internal pressure of the battery cannot be suppressed with the mixed solvent of MEC having the low boiling point of 108° C. and DMC having the lower boiling point of 90° C. However, by adding diethyl carbonate (DEC) having a higher boiling point of 126° C., the rise in internal pressure of the battery can be suppressed.

It is preferable to add DEC by 1 to 20 vol %, and more preferably 3 to 15 vol %, to the mixed solvent of the solvent with high dielectric constant, MEC and DMC. The excessive addition of DEC departing from the range prescribed in the present invention will cause loss of safety in the case of overcharge and acceleration of capacity deterioration after the high-temperature storage of the charged battery. Thus, the amount of addition of DEC should be limited to the minimum allowable level.

As the electrolyte dissolved in the non-aqueous solvent, $LiPF_6$ is particularly preferable, and $LiClO_4$, $LiAsF_6$ and $LiBF_4$ can also be employed, while any electrolyte usable for this type of battery may be employed. These electrolytes can be dissolved in the non-aqueous solvent at a concentration of 0.1 to 3 mol/l, but preferably at a density of 0.5 to 2 mol/l.

Preferred embodiments of the present invention will now be described based upon results of experiments.

Structure of Produced Battery

Figure 1:
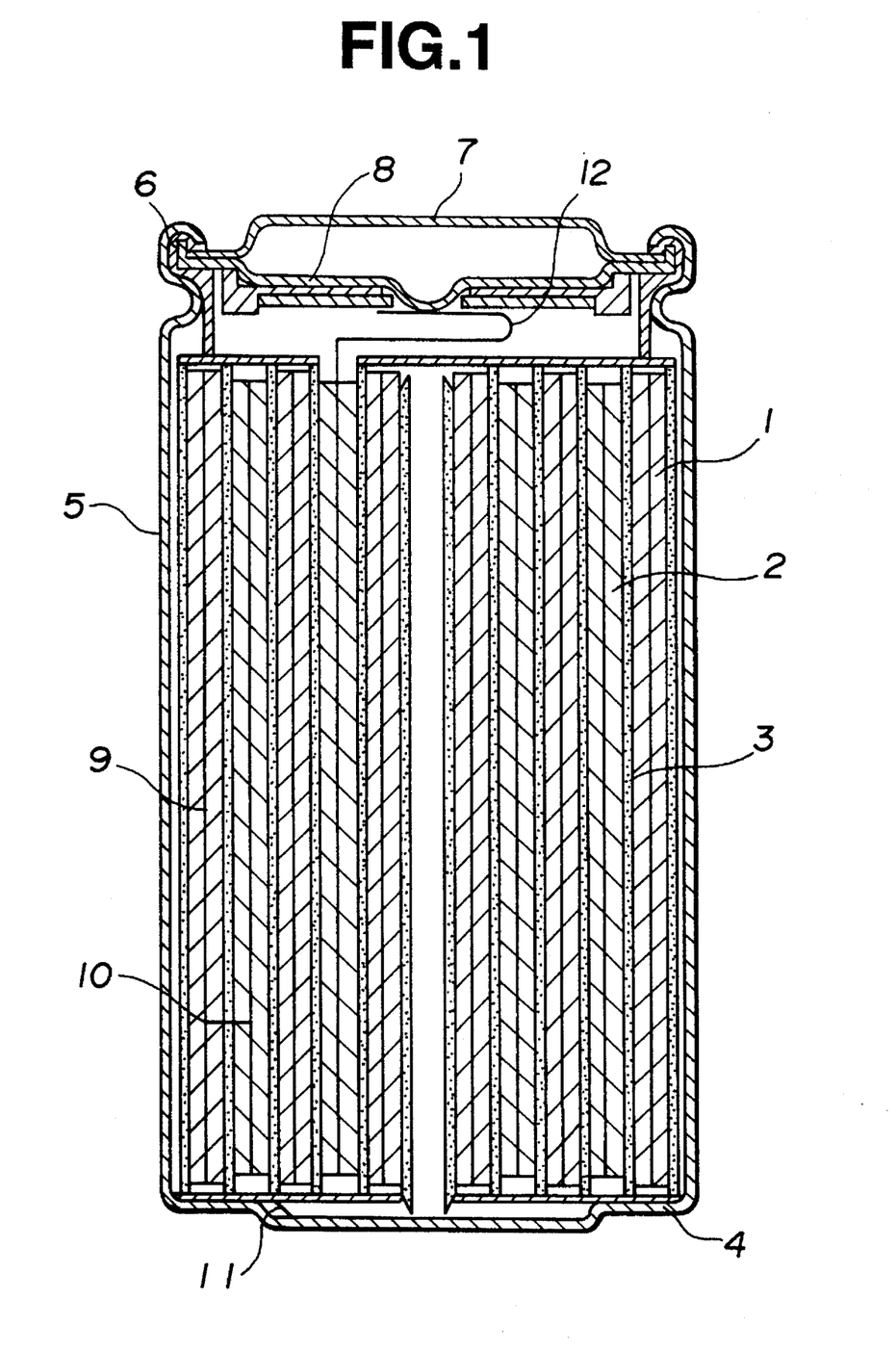
FIG. 1 is a schematic cross-sectional view showing an exemplary structure of a secondary battery having a non-aqueous electrolyte to which the present invention is applied.

FIG. 1 shows the structure of a battery to be produced in each embodiment, as later described.

The secondary battery having a non-aqueous electrolyte includes, as shown in FIG. 1, a negative electrode 1 formed by applying an active anode material to an anode collector 9, a positive electrode 2 formed by applying an active cathode material to a cathode collector 10, the negative and positive electrodes 1 and 2 being coiled through a separator 3, and insulators 4 loaded on and under the coiled body, contained in a battery can 5.

Battery lids 7 are caulked to the battery can 5 through a sealing gasket 6, and are electrically connected to the negative electrode 1 and the positive electrode 2 via an anode lead 11 and a cathode lead 12, respectively, for serving as the negative and positive electrodes.

In the battery of the present embodiment, the cathode lead 12 is welded to a current breaker thin plate 8, through which the cathode lead 12 is electrically connected to the battery lid 7.

In the battery of this structure, a rise in internal pressure causes the current breaker thin plate 8 to be pushed up to be deformed. Then, the cathode lead 12 is cut out with the portion welded to the current breaker thin plate 8 being left, thus breaking the current.

EXAMPLES 1 TO 5

First, the negative electrode 1 was produced as follows.

Oxygen-containing functional groups were introduced by 10 to 20 wt % into a petroleum pitch as the starting material for oxygen cross-linking. Then, the resulting material was carbonized in an inactive gas current, forming a carbonaceous precursor. The precursor was calcined at 1200° C., to form a carbonaceous material having characteristics similar to those of glass like carbon. This carbonaceous material exhibited the interplanar distance of the (002) plane of 0.381 nm and the crystallite size of 1.2 nm in C-axis, as measured by X-ray diffraction measurement. It also exhibited the heating peak at 659° C., as observed in differential thermal analysis in the air current. In addition, the carbonaceous material exhibited the true density of 1.54 g/cm³, as measured by pycnometer, and the 50% cumulative grain size of 23.5 μm, as measured by laser diffraction.

90 parts by weight of powders of the carbonaceous material thus produced and 10 parts by weight of polyvinylidene fluoride (PVDF) as a binder were mixed together to prepare an anode agent, and the anode agent thus produced was dispersed into a N-methylpyrrolidone solvent to prepare an anode agent slurry paste.

The anode agent slurry thus produced was applied onto both surfaces of an anode collector of a band-shaped copper foil, 10 µm in thickness, and was dried and compressed in molding to produce a band-shaped negative electrode 1. The agent of the negative electrode 1 is 80 µm in thickness on each surface, and the electrode is 41.5 mm in width and 700 mm in length.

The positive electrode 2 was produced in the following manner.

Lithium carbonate and cobalt carbonate were mixed together at a molar ratio of 0.5 to 1, and the resulting mixture was calcined in air at 900° C. for 5 hours, forming $LiCoO_2$. The peak of the $LiCoO_2$ thus produced, as measured by X-ray diffraction, was well in conformity with the peak of $LiCoO_2$ registered in the JCPDS file. The material was ground, forming $LiCoO_2$ powders having the 50% cumulative grain size of 15 µm. 91 parts by weight of a mixture consisting of 95 parts by weight of the $LiCoO_2$ powders and 5 parts by weight of lithium carbonate powders, 6 parts by weight of graphite as an conductive material, and 3 parts by weight of polyvinylidene fluoride as a binder, were mixed together to prepare a cathode agent. The cathode agent thus produced was dispersed into N-methylpyrrolidone to prepare a cathode agent slurry paste.

The cathode agent slurry was uniformly applied onto both surfaces of a cathode collector of a band-shaped aluminum foil, and was dried and compressed in molding to produce the band-shaped positive electrode 2. The cathode agent of the band-shaped positive electrode 2 is 80 µm on each surface, and the electrode is 40.5 mm in width and 650 mm in length.

The band-shaped negative electrode 1, the band-shaped positive electrode 2 and the separator 3 of a fine porous polypropylene film, 25 µm in thickness and 44 mm in width, were stacked in order of the negative electrode, the separator, the positive electrode and the separator, and were then coiled for a number of times to form a spiral electrode, 20 mm in outer diameter.

The spiral electrode was contained in the nickel-plated iron battery can 5, and insulator plates 4 were placed on upper and lower surfaces of the spiral electrode. The aluminum cathode lead 12 was led out from the cathode collector and welded to the battery lid 7, while the nickel anode lead 11 was led out from the anode collector and welded to the battery can 5.

An electrolyte, formed by dissolving $LiPF_6$ at a density of 1 mol/l into a mixed solvent of PC, MEC and DMC mixed at various mixing ratios, was injected into the battery can 5 containing the spiral electrode therein. Then, the battery can 5 was caulked though the insulating sealing gasket 6 coated with asphalt, thus fixing the safety valve unit 8 and the battery lead 7 to maintain an air tight state within the battery. Thus, a cylindrical secondary battery having a non-aqueous electrolyte, 20 mm in diameter and 50 mm in height, was produced.

The mixing ratios of volume of the non-aqueous solvent in the electrolyte, injected into the battery can 5, are shown in Table 1.

TABLE 1

| | Mixing Ratio of Volume of Non-Aqueous Solvent |
|---|---|
| Example 1 | PC:MEC:DMC = 5:4:1 |
| Example 2 | PC:MEC:DMC = 5:2.5:2.5 |
| Example 3 | PC:MEC:DMC = 5:1:4 |
| Example 4 | PC:MEC:DMC = 4:3:3 |
| Example 5 | PC:MEC:DMC = 5:0.5:4.5 |

COMPARATIVE EXAMPLE 1

A secondary battery having a non-aqueous electrolyte was produced similarly to Example 1, except for the use of a mixed solvent of PC and MEC at a mixing volume ratio of 5:5 as the non-aqueous solvent of the electrolyte.

COMPARATIVE EXAMPLE 2

A secondary battery having a non-aqueous electrolyte was produced similarly to Example 1, except for the use of a mixed solvent of PC and DEC at a mixing ratio of 5:5 as the non-aqueous solvent of the electrolyte.

Review on Reactivity of Solvent with Lithium Metal

For examining reactivity, with the lithium metal, of the low-viscosity solvent used for the secondary battery having a non-aqueous electrolyte thus produced, the following experiment was conducted.

First, DEC, DMC and MEC were entered respectively in teflon containers, and lithium metal flakes were entered into these solvents. These teflon containers containing the solvents and the lithium metal flakes were sealed not to allow intrusion by water, and were then stored in high-temperature tubs at various temperatures.

Reactions of the solvents with the lithium metal flakes in the storage are shown in Table 2.

TABLE 2

| | Storage Conditions | | | |
|---|---|---|---|---|
| | 60° C. 1 Hour | 70° C. 1 Hour | 80° C. 1 Hour | 60° C. 1 Week |
| DEC | No Reaction | No Reaction | Reacted After 10 min. | Solvent Browned, Caked |
| DMC | No Reaction | No Reaction | No Reaction | Partly Blackened |
| MEC | No Reaction | No Reaction | No Reaction | Partly Blackened |

The lithium metal flake, having its surface covered with a natural oxidation film, does not immediately react. However, if injected into DEC, the lithium metal flake starts reacting with DEC after being stored at relatively high temperatures of 80° C. for 10 minutes. Also, the lithium flake, if injected into DEC and stored at 60° C. for 1 week, reacts with DEC to be finally extinguished. DEC into which the lithium metal flake has been injected is caked in brown.

On the other hand, in the cases where the lithium metal flake is injected into DMC and MEC, no such reaction occurs as that in the case of the lithium metal flake injected into DEC.

It has been found from the above that the use of DEC as the low viscosity solvent of the secondary battery having a non-aqueous electrolyte is inappropriate, as having high possibility of reacting with the lithium metal precipitated at the negative electrode of an overcharged battery.

Review on DMC Addition

Figure 2:
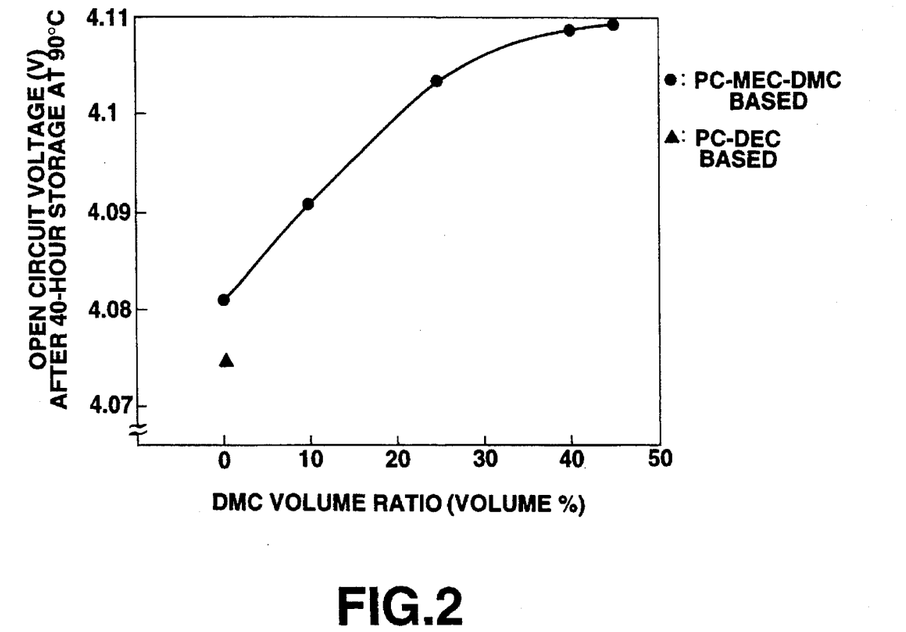
FIG. 2 is a graph showing the relation between the dimethyl carbonate (DMC) mixing ratio in an electrolyte and the open circuit voltage after high-temperature storage of a charged battery.
Figure 3:
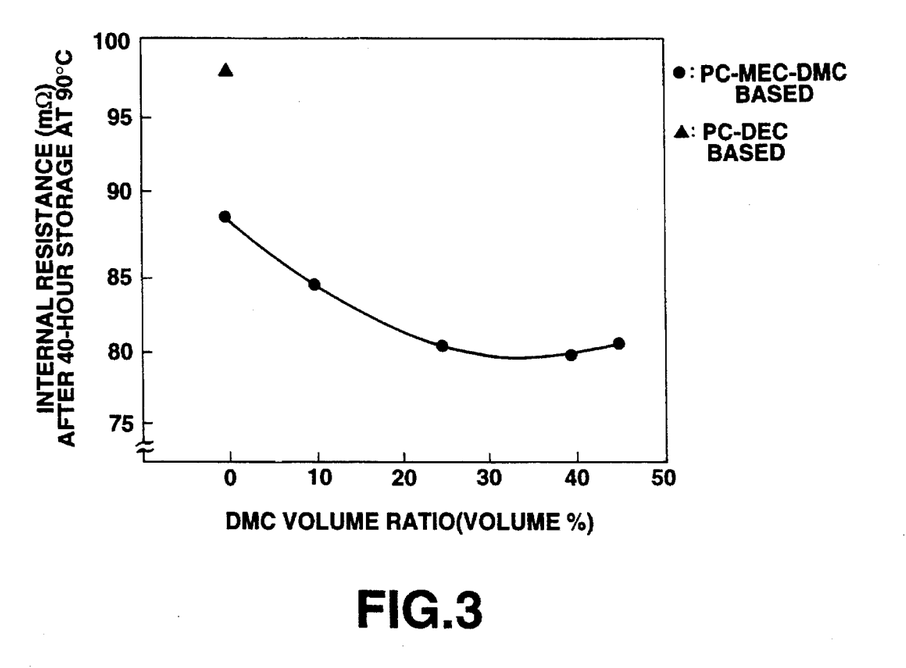
FIG. 3 is a graph showing the relation between the DMC mixing ratio in the electrolyte and the internal pressure after the high-temperature storage of the charged battery.
Figure 4:
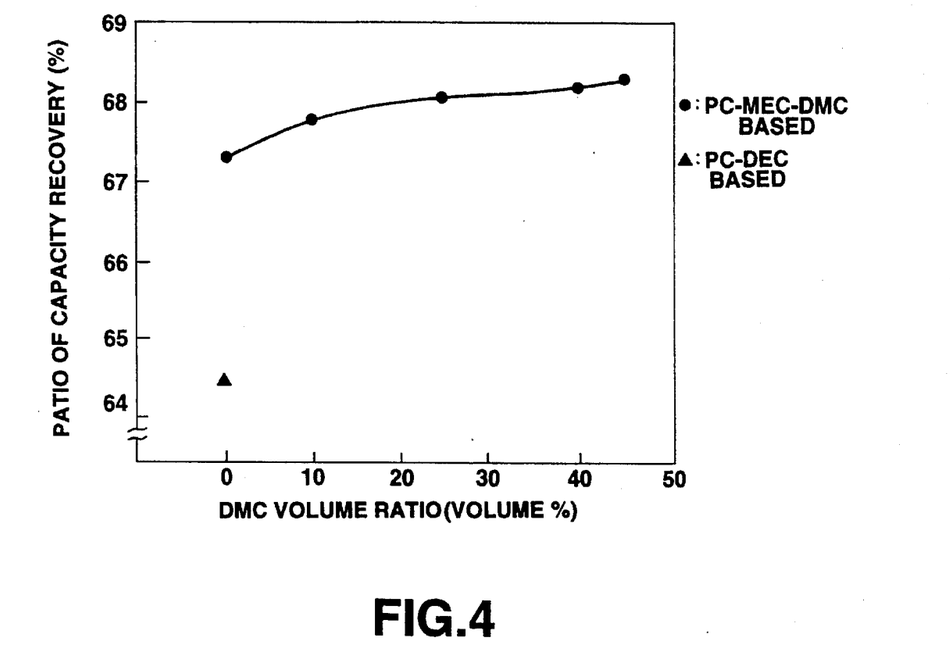
FIG. 4 is a graph showing the relation between the DMC mixing ratio in the electrolyte and the ratio of capacity recovery.
Figure 5:
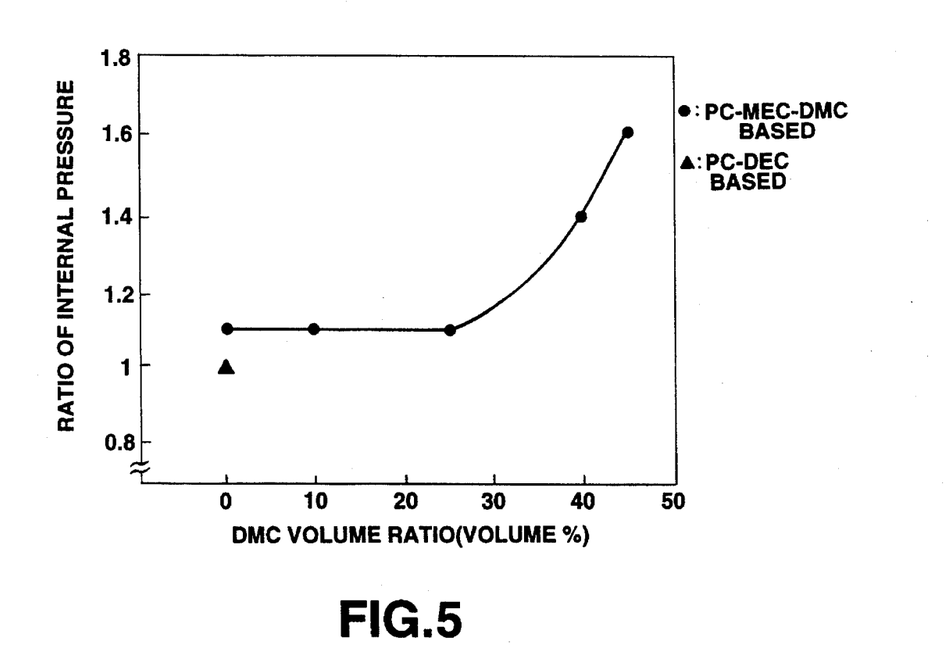
FIG. 5 is a graph showing the relation between the DMC mixing ratio in the electrolyte and the ratio of internal pressures of the battery before and after the high-temperature storage.

For now examining effects of mixing DMC with the non-aqueous solvent, the open circuit voltage and the internal resistance with an AC of 1 kHz immediately after 11th cycle of charge in repetition of charge/discharge cycles, and the open circuit voltage and the internal resistance with an AC of 1 kHz after a 40-hour storage at 90° C. in a charged state following the 11th cycle of charge, were measured. In addition, the ratio of battery internal pressures before and after storage, and the ratio of the capacity of the 10th charge/discharge cycle before storage to the capacity of the 2nd charge/discharge cycle after storage, that is, the rate of capacity recovery, were found. The results of the measurement are shown in Table 3. The relation between the mixing ratio of DMC volume in the electrolyte and the open circuit voltage after storage is shown in FIG. 2, and the relation between the mixing ration of DMC volume and the internal resistance after storage is shown in FIG. 3. The relation between the mixing ratio of DMC volume and the rate of capacity recovery is shown in FIG. 4, while the relation between the mixing ratio of DMC volume and the internal pressures before and after storage is shown in FIG. 5.

In the charge/discharge cycle, constant current charge was performed with the charge current of 1 A and the highest voltage (constant voltage) of 4.2 V, and then discharge was performed with the resistance of 6.2 Ω and the final voltage of 2.75 V.

TABLE 3

|  | Before the 11th Cycle of Storage | | After the 11th Cycle of Storage | | | Battery |
| --- | --- | --- | --- | --- | --- | --- |
|  | Open Cir. Voltage (V) | Internal Resist (mΩ) | Open Cir. Voltage (V) | Internal Resist (mΩ) | Recovery Rate of Capacity (%) | Internal Pressure Before and After Storage |
| Ex. 1 | 4.200 | 63 | 4.091 | 84 | 67.8 | 1.1 |
| Ex. 2 | 4.200 | 62 | 4.104 | 80 | 68.1 | 1.1 |
| Ex. 3 | 4.200 | 62 | 4.109 | 80 | 68.2 | 1.4 |
| Ex. 4 | 4.200 | 62 | 4.132 | 78 | 68.8 | 1.1 |
| Ex. 5 | 4.200 | 62 | 4.109 | 80 | 68.3 | 1.6 |
| Com. Ex. 1 | 4.200 | 63 | 4.081 | 88 | 67.3 | 1.1 |
| Com. Ex. 2 | 4.200 | 65 | 4.075 | 98 | 64.5 | 1.0 |

It is seen in Table 3 and FIGS. 2 though 4 that as the mixing ratio of DMC volume in the electrolyte is greater, the internal resistance after storage is lower and the open circuit voltage is higher while the rate of capacity recovery is higher. It has been thus found that the addition of DMC to the non-aqueous solvent prevents the deterioration in capacity generated by leaving the charged battery at high temperatures.

However, as seen in FIG. 5, if the mixing ratio of DMC volume in the electrolyte is excessively large, the internal pressure of the battery after high-temperature storage is higher because of the relatively low boiling point of DMC. That is, it has been found preferable to add DMC at a D/M ratio of $9/1 \leq D/M \leq 2/8$ with M denoting the MEC volume and D denoting the DMC volume in the electrolyte.

Review on DEC Addition

Then, in order to examine effects of DEC addition to the non-aqueous solvent, a battery was produced similarly to Example 4 except for addition of DEC within a range of 1 to 30 vol % to a non-aqueous solvent having a composition of PC:MEC:DMC=4:3:3. (See Examples 4-A through 4-F.)

The battery to which DEC has been added, the battery of Example 4 and the battery of Comparative Example 2 were stored in charged states at 105° C. for 8 hours on the assumption that these batteries were left on the dash board of an automobile in summer. The internal pressures of the batteries were measured while their appearances were observed. Meanwhile, the batteries were charged through constant current charge at the charge current of 1 A, the highest voltage of 4.2 V (constant voltage) for 2.5 hours.

Also, in the manner similar to the above, the open circuit voltage and the internal resistance (AC of 1 kHz) immediately after the 11th cycle of charge in the repetition of the charge/discharge cycles, and the open circuit voltage and the internal resistance (AC of 1 kHz) after a 40-hour storage at 90° C. in the charged stage following the 11th cycle of charge, were measured. In addition, the ratio of battery internal pressures before and after storage, and the ratio of the capacity of the 10th charge/discharge cycle before storage to the capacity of the nd charge/discharge cycle after storage (rate of capacity recovery) were found. Results of the 105° C. 8-hour storage test and those of the 90° C. 40-hour storage test are shown in Tables 4 and 5, respectively.

TABLE 4

|  | Amount of DEC Addition (volume %) | 105° C. 8-Hour Storage Test | | |
| --- | --- | --- | --- | --- |
|  |  | Ratio of Battery Internal Pressures Before and After Storage | Anomaly in Appearance | Operation of Battery |
| Ex. 4 | 0 | 1.7 | None | Possible |
| Ex. 4-A | 1 | 1.6 | None | Possible |
| Ex. 4-B | 3 | 1.6 | None | Possible |
| Ex. 4-C | 5 | 1.4 | None | Possible |
| Ex. 4-D | 10 | 1.2 | None | Possible |
| Ex. 4-E | 20 | 1.1 | None | Possible |
| Ex. 4-F | 30 | 1.1 | None | Possible |
| Comp. Ex. 2 | 0 | 1.0 | None | Possible |

TABLE 5

| | 90° C. Storage Test | | | | | |
|---|---|---|---|---|---|---|
| | Before the 11th Cycle of Storage | | After the 11th Cycle of Storage | | | Ratio of Battery |
| | Open Cir. V. (V) | Internal Resist (mΩ) | Open Cir. V. (V) | Internal Resist (mΩ) | Recovery Rate of Capacity (%) | Internal Pressures Before and After Storage |
| Ex. 4 | 4.200 | 62 | 4.132 | 78 | 68.8 | 1.1 |
| Ex. 4-A | 4.200 | 62 | 4.132 | 79 | 68.7 | 1.1 |
| Ex. 4-B | 4.200 | 62 | 4.131 | 81 | 68.7 | 1.1 |
| Ex. 4-C | 4.200 | 62 | 4.130 | 81 | 68.6 | 1.1 |
| Ex. 4-D | 4.200 | 62 | 4.125 | 82 | 67.6 | 1.1 |
| Ex. 4-E | 4.200 | 62 | 4.115 | 85 | 67.4 | 1.1 |
| Ex. 4-F | 4.200 | 63 | 4.096 | 90 | 66.3 | 1.1 |
| Com Ex. 2 | 4.200 | 63 | 4.075 | 98 | 64.5 | 1.0 |

As seen in Table 4, the greater the amount of DEC addition to the non-aqueous solvent is, the lower the battery internal pressure after the 105° C. 8-hour storage is. Thus, the addition of DEC to the non-aqueous solvent is effective for preventing generation of gases in the high-temperature storage.

However, referring to Table 5 relating to battery characteristics after the 90° C. 40-hour storage, as the amount of DEC addition increases, the open circuit voltage is lowered and the internal resistance is raised while the rate of capacity recovery is lowered. It is therefore not preferable to add an excessively large amount of DEC, but preferable to add DEC within a range of 1 to 20 vol %.

With the secondary battery having a non-aqueous electrolyte thus produced, the open circuit voltage and the internal resistance (AC of 1 kHz) immediately after the 11th cycle of charge in the repetition of charge/discharge cycles as described above, and the open circuit voltage and the internal resistance (AC of 1 kHz) after the 40-hour storage at 90° C. in the charged state after the 11th charge cycle, were measured. Also, the ratio of battery internal pressures before and after storage, and the ratio of the capacity of the 2nd charge/discharge cycle after storage to the capacity of the 10th charge/discharge cycle before storage (rate of capacity recovery), were measured. The results are shown in Table 6.

TABLE 6

| | Before the 11th Cycle of Storage | | After the 11th Cycle of Storage | | | Ratio of Battery |
|---|---|---|---|---|---|---|
| | Open Cir. V. (V) | Internal Resist (mΩ) | Open Cir. V. (V) | Internal Resist (mΩ) | Recovery Rate of Capacity (%) | Internal Pressures Before and After Storage |
| Ex. 6 | 4.200 | 65 | 4.065 | 93 | 68.5 | 1.2 |
| Com. Ex. 3 | 4.200 | 67 | 4.007 | 112 | 67.9 | 1.1 |

EXAMPLE 6

A non-aqueous electrolyte battery was produced similarly to Example 1 except for the use of artificial graphite KS-75 (produced by Lonza) having the interplanar distance of the (002) plane of 0.3358 nm, the crystallite size of 25.4 nm in C-axis, the Raman spectrum G value of 8.82, the true specific gravity of 2.23 and the average grain size of 28.4 μm, as the carbonaceous material for the negative electrode, and the use of a mixed solvent of EC, MEC and DMC mixed at a volume ratio of EC:MEC:DMC=5:2:3, as the non-aqueous solvent of the electrolyte.

COMPARATIVE EXAMPLE 3

A secondary battery having a non-aqueous electrolyte was produced similarly to Example 2 except for the use of a mixed solvent of EC and MEC mixed at a volume ratio of 5:5, as the non-aqueous solvent of the electrolyte.

As seen in Table 6, the secondary battery having a non-aqueous electrolyte of Example 6 having DMC mixed into the electrolyte exhibits the lower internal resistance, the higher open circuit voltage and the higher rate of capacity recovery after storage than the secondary battery having a non-aqueous electrolyte of Comparative Example 3 not having DMC mixed into the electrolyte.

It has been thus found that the mixing of DMC into the electrolyte prevents the capacity deterioration generated by the high-temperature storage of the charged battery even with the use of EC as the solvent with high dielectric constant.

The embodiments to which the present invention is applied have been described above in detail. However, it is to be understood that the present invention is not limited to these specific embodiments, and that various changes and modifications may be effected without departing from the scope of this invention.

As is clear from the above description, in the present invention, the secondary battery having a non-aqueous electrolyte, using a carbonaceous material capable of lithium dope and undope as the anode material and using a lithium-transition metal composite oxide as the cathode material, employs a mixed solvent of methylethyl carbonate and dimethyl carbonate as the low viscosity solvent. Therefore, the secondary battery having a non-aqueous electrolyte, in which normal charge/discharge reactions can be maintained even in battery overcharge or after the high-temperature storage of the charged battery, and which exhibits a higher energy density, a longer cycle life, higher safety performance and excellent environment-resistance, can be produced.

What is claimed is:

1. A secondary battery having a non-aqueous electrolyte comprising:

a negative electrode consisting essentially of a resin binder and a non-graphitic carbonaceous material capable of doping and undoping lithium ions as an active anode material, said non-graphitic carbonaceous material exhibiting an interplanar distance of the (002) plane of 0.37 nm and greater, a true density of 1.7 g/cm$^3$ and less, and an exothermic peak at 700° C. and lower observed in differential thermal analysis in an air current;

a positive electrode including a composite oxide of lithium and a transition metal as an active cathode material; and a non-aqueous electrolyte including a dissolved electrolyte in a non-aqueous solvent, the solvent including from about 20% to about 80% by volume of a mixture of methylethyl carbonate and dimethyl carbonate wherein the volume ratio of methylethyl carbonate and dimethyl carbonate is from about 1:9 to about 8:2, respectively, and a high dielectric constant propylene carbonate solvent.

2. The secondary battery having a non-aqueous electrolyte as is claimed in claim 1, wherein diethyl carbonate is present in the non-aqueous solvent in an amount of from about 1 to 20 vol %.

3. A secondary battery as defined in claim 1, wherein the dissolved electrolyte is selected from the group consisting of: $LiPF_6$, $LiClO_4$, $LiAsF_6$ and $LiBF_4$ and the dissolved electrolyte is present in an amount of from about 0.1 to about 3 moles per liter of non-aqueous solvent.

4. A secondary battery as defined in claim 1, wherein the composite oxide is $LiCoO_2$.

5. A secondary battery having a non-aqueous electrolyte comprising:

a negative electrode consisting essentially of a graphitic carbonaceous material capable of doping and undoping lithium ions as an active anode material, said graphitic carbonaceous material exhibiting an interplanar distance of the (002) plane of 0.340 nm and smaller, a crystallite size of 14.0 nm and greater in C-axis, and a true density of 2.1 g/cm$^3$ and greater;

a positive electrode including a composite oxide of lithium and a transition metal as an active cathode material; and a non-aqueous electrolyte including a dissolved electrolyte in a non-aqueous solvent, the solvent including from about 20% to about 80% by volume of a mixture of methylethyl carbonate and dimethyl carbonate wherein the volume ratio of methylethyl carbonate and dimethyl carbonate is from about 1:9 to about 8:2, respectively, and a high dielectric constant ethylene carbonate solvent.

6. A secondary battery as defined in claim 5, wherein the dissolved electrolyte is selected from the group consisting of: $LiPF_6$, $LiClO_4$, $LiAsF_6$ and $LiBF_4$ and the dissolved electrolyte is present in an amount of from about 0.1 to about 3 moles per liter of non-aqueous solvent.

7. A secondary battery as defined in claim 5, wherein the composite oxide is $LiCoO_2$.

* * * * *